United States Patent
Day et al.

(10) Patent No.: US 7,882,399 B2
(45) Date of Patent: Feb. 1, 2011

(54) INTELLIGENT JOB FUNCTIONALITY

(75) Inventors: Paul Reuben Day, Rochester, MN (US);
Roger Alan Mittelstadt, Byron, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/955,465

(22) Filed: Dec. 13, 2007

(65) Prior Publication Data

US 2009/0158091 A1    Jun. 18, 2009

(51) Int. Cl.
*G06F 11/00* (2006.01)

(52) U.S. Cl. .............. 714/38; 714/15; 714/16
(58) Field of Classification Search .......... 714/15, 714/16, 38
See application file for complete search history.

(56) References Cited

U.S. PATENT DOCUMENTS

| | | | | |
|---|---|---|---|---|
| 5,799,173 A * | 8/1998 | Gossler et al. | | 703/21 |
| 5,835,698 A * | 11/1998 | Harris et al. | | 714/15 |
| 6,938,246 B2 * | 8/2005 | Alford et al. | | 717/128 |
| 7,124,119 B2 * | 10/2006 | Bigus et al. | | 706/10 |
| 7,299,466 B2 * | 11/2007 | Pulsipher et al. | | 718/102 |
| 7,523,348 B2 * | 4/2009 | Anand et al. | | 714/16 |
| 2002/0019786 A1 * | 2/2002 | Gonzalez et al. | | 705/28 |
| 2002/0019884 A1 * | 2/2002 | Gungabeesoon | | 709/310 |
| 2003/0051188 A1 * | 3/2003 | Patil | | 714/4 |
| 2003/0120708 A1 * | 6/2003 | Pulsipher et al. | | 709/106 |
| 2003/0120709 A1 * | 6/2003 | Pulsipher et al. | | 709/106 |
| 2003/0120710 A1 * | 6/2003 | Pulsipher et al. | | 709/106 |
| 2004/0030882 A1 * | 2/2004 | Forman | | 713/100 |
| 2005/0086446 A1 * | 4/2005 | McKenney et al. | | 711/163 |
| 2005/0097398 A1 * | 5/2005 | Day et al. | | 714/38 |
| 2008/0243865 A1 * | 10/2008 | Hu et al. | | 707/10 |

* cited by examiner

*Primary Examiner*—Robert Beausoliel
*Assistant Examiner*—Joshua P Lottich
(74) *Attorney, Agent, or Firm*—Wood, Herron & Evans, LLP; James R. Nock

(57) ABSTRACT

A method, apparatus, and program product utilize intelligent job functionality to diagnose an error in a computer. After detecting an error in a first job processing a task, and in response to another attempt to perform the task, a job selection algorithm selects a predetermined job in which to perform the task and diagnose the error. The predetermined job can be the first job or a new job associated with a signature that corresponds to the task that experienced the error. The predetermined job can be used to diagnose the error in a debugging session. Alternately, the first job may enter a debug session immediately after experiencing an error.

24 Claims, 2 Drawing Sheets

INTELLIGENT JOB FUNCTIONALITY

FIELD OF THE INVENTION

The present invention relates to computing systems, and more particularly to detecting and isolating errors in pre-started jobs.

BACKGROUND OF THE INVENTION

Modern tasks of a computer systems may require that a task, application, or process be started, run, and stopped hundreds of times. As a consequence, a computer system can quickly exhibit poor performance and suffer usage issues when it has to constantly recreate an environment in which to run the application. To alleviate this requirement pre-started jobs may be utilized.

A job is generally an execution path through an address space of a computer. The job may be as simple as a set of program instructions loaded in memory or as complex as an instance of an application or program. A pre-started job is a job loaded from a storage device, such as a hard disk drive or electronic memory, active in memory and ready for immediate use. With a pre-started job the computer system can quickly process information specific to that pre-started job without waiting for program load times, allocation of memory, configuration of the program, configuration of data, processor scheduling, or other overhead associated with starting the job from scratch. Generally speaking, pre-started jobs are active in memory in a "pool" and chosen by the computer system for a particular task by a job-selection algorithm. The management of pre-started jobs is known colloquially as "job pooling." Conventional algorithms typically select the pre-started job for the task without performing monitoring of the status, state, or integrity of the pre-started job. Additionally, conventional algorithms may not be aware or concerned with previous faults, exceptions, fault conditions, poor performance, or failures of a pre-started job. This is especially true in an environment where multiple conventional algorithms are selecting pre-started jobs from the same pool and releasing them when done.

Once a pre-started job has finished with its task a conventional algorithm typically terminates the pre-started job or to return it to the pool of pre-started jobs. In a computer system constantly performing similar tasks, such as a web-server constantly serving Internet web pages to a computer, an algorithm will often return the pre-started jobs to the pool for future processing needs. Over time, however, a pre-started job may experience a fault condition such as a function check, an exception, failure, or performance impairment. A function check in a pre-started job may be issued if there is an incorrect input or output from the pre-started job. Similarly, an exception of a pre-started job may result from an illegal operation of the pre-started job. A failure of a pre-started job typically results in the pre-started job being terminated and the job started again, then that newly started job assigned to the pre-started job pool.

In a conventional job selection algorithm, performance impairments in a pre-started job typically remain undetected, thus slowing the computer system as it processes a task with an impaired pre-started job. After the task in the impaired pre-started job is processed, if it finishes, a conventional algorithm still typically returns the impaired pre-started job to the pool of pre-started jobs. In this way, the impaired pre-started job may again be selected by a conventional job-selection algorithm without addressing the performance impairment.

When a conventional algorithm determines that there has been a function check, exception, pre-started job failure, or poor performance of a pre-started job it typically notifies the computer system. Upon being notified of the error, the computer system typically terminates the affected pre-started job, starts the job again, and puts the newly started job in the pre-started job pool. This process of termination and initiation of a job ultimately taxes the computer system and may leave the cause of the function check unresolved. In this way, conventional algorithms only address the outcome of a fault condition and not its origin.

After a conventional algorithm determines there has been a fault condition in a pre-started job there is typically no way to stop operation of the pre-started job and debug the cause of the fault condition. When the pre-started job is a part of mainline code it is impossible for a conventional algorithm to insert a trap in the code because the mainline code is fixed and cannot be changed. Similarly, in the event the pre-started job that has experienced the fault condition is unknown, it is impossible for a conventional algorithm to insert a breakpoint into the code of the pre-started job. In this way, conventional processing of the pre-started job does not allow for debugging of the cause of the fault condition of the pre-started job.

Consequently, there is a need for an improved manner of debugging pre-started jobs.

SUMMARY OF THE INVENTION

Embodiments of the invention provide for intelligent job functionality in a computer that monitors a task performed in a pre-started job for performance impairments or errors, then overrides a job selection algorithm when there have been performance impairments or errors to debug the pre-started job when there is another attempt to perform the task.

In accordance with embodiments of the invention, the intelligent job functionality generates a signature corresponding to a specific task when the task experiences a fault condition in a pre-started job. The intelligent job functionality associates the signature with the pre-started job and returns the pre-started job to a pool of pre-started jobs. When there is another attempt to perform the task, the intelligent job functionality retrieves the pre-started job associated with the signature of the task and enables a user or an operator to debug the associated pre-started job to determine the cause of the fault condition. Debugging the associated pre-started job may involve halting the pre-started job and alerting the user that a fault condition has occurred. Debugging the associated pre-started job may also involve giving the user the ability to diagnose, audit, trace, monitor, and/or correct the fault condition in the pre-started job.

In one embodiment of the invention, the intelligent job functionality immediately debugs the pre-started job after a fault condition. Immediately debugging the pre-started job may involve reversing operations of the process steps to a previous time, such as before the point the fault condition occurred and before any data or parameters requested by the pre-started job are loaded. Immediately debugging the pre-started job may also involve halting operation and prompting the user for input. Immediately debugging the pre-started job may further involve a debugging session that allows the user to take control, diagnose, audit, trace, monitor, and/or correct the fault condition.

In one embodiment of the invention, when there is no pre-started job in the pre-started job pool, the job selection algorithm creates a new job and selects the new job to perform the task and diagnose the error. A user may also have the ability to override the job selection algorithm to prevent creation of a new job.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
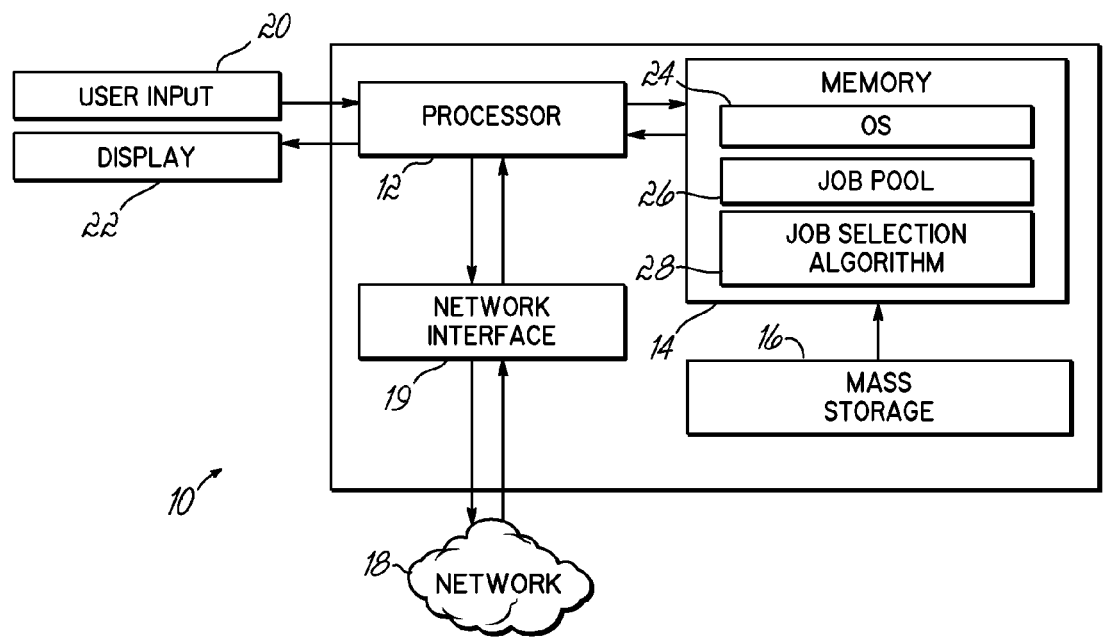
FIG. 1 is an exemplary hardware and software environment for a computing device suitable for implementing intelligent job functionality consistent with the invention.

Turning to the drawings, wherein like numbers denote like parts throughout the several views, FIG. 1 illustrates an exemplary hardware and software environment for a computing device 10 suitable for implementing intelligent job functionality consistent with an embodiment of the invention. Computing device 10 may be a computer, computer system, server, disk array, or programmable device such as a multi-user computer, a single-user computer, a handheld device, a networked device, a mobile phone, a gaming system, etc. Computing device 10 will be referred to as "computer" for the sake of brevity.

Computer 10 includes at least one processor 12 coupled to memory 14. Processor 12 can be one or more processors, controllers, or field programmable gate arrays, while memory 14 can be random access memory devices, cache memories, non-volatile memories, and read-only memories. Memory 14 can additionally be part of the processor 12 or located elsewhere in the computer 10, such as in a mass storage device 16 or as another computer coupled to computer 10 through a network 18. Network 18 can be an internal network of computers connected by communications wires, a network of computers connected wirelessly, or a worldwide publicly accessible series of interconnected computer networks such as the Internet. Network 18 is coupled to processor 12 of computer 10 through a network interface 19.

Coupled to computer 10 is a user interface 20 for external communication. User interface 20 is operable by a user, operator, or administrator of a computer 10 and typically includes one or more user input devices (e.g., a keyboard, a mouse, a trackball, a joystick, a touchpad, a keypad, a stylus, and/or microphone, among others). Computer 10 also includes a display 22 (e.g., a CRT monitor, an LCD display panel, and/or speaker, among others). The interface to computer 10 may also be through an external terminal connected directly or remotely to computer, or through another computer communicating with computer 10 by way of network 18, modem, or other type of communications.

An operating system 24 controls the operations of computer 10 and executes various tasks requested. Tasks may be requested by the user of the computer 10, the processor 12, the operating system 24, or another computer communicating with computer 10 through the network 18. The operating system 24 completes a task by using a job. A job is generally a single instance of an application or program that may be specifically assigned to the task. The operating system 24 may select the job from a pool of pre-started jobs 26 using a job selection algorithm 28. Pre-started jobs are jobs that are active in memory 14 and do not have to be created, loaded, or started. Pre-started jobs are useful when there is a need to perform a specific task or tasks a large number of times. The pre-started job pool 26 in memory 18 organizes the pre-started jobs and enables quick access by the operating system 24 and processor 12.

In general, the routines to implement the embodiments of the invention, whether implemented as part of an operating system or a specific application, component, algorithm, object, module, program, or sequence of instructions will be referred to herein as "computer program code" or simply "program code." The program code typically comprises one or more instructions that are resident at various times in memory and storage devices in a computer. When read and executed by the at least one processor in a computer, the program code causes the computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Job Selection Algorithm

Figure 2:
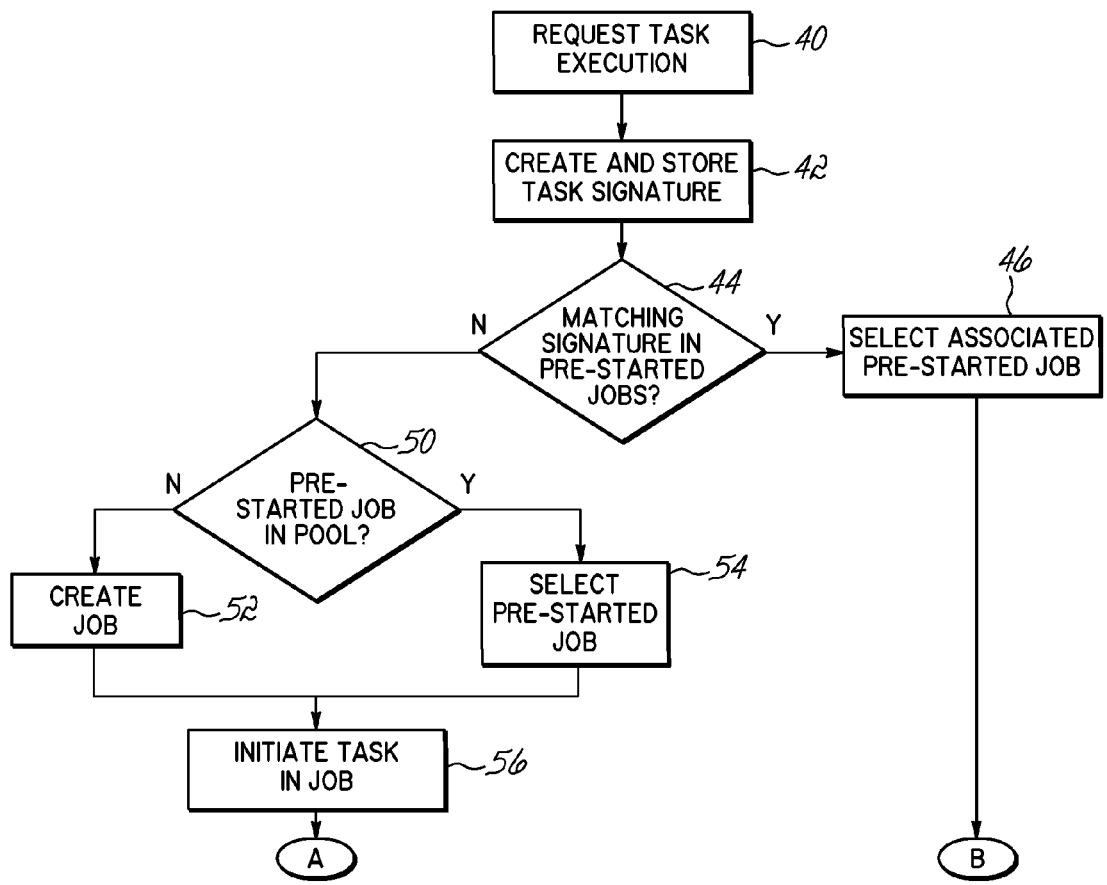
FIGS. 2-4 are a flowchart illustration of one exemplary implementation of the job selection algorithm referenced in FIG. 1.
Figure 3:
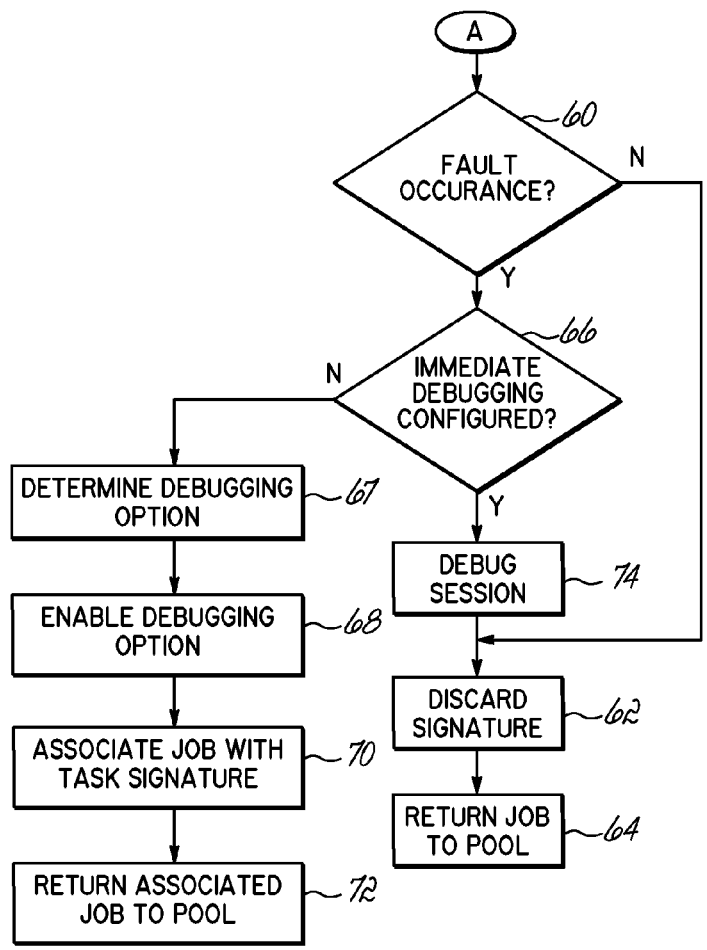
Figure 4:
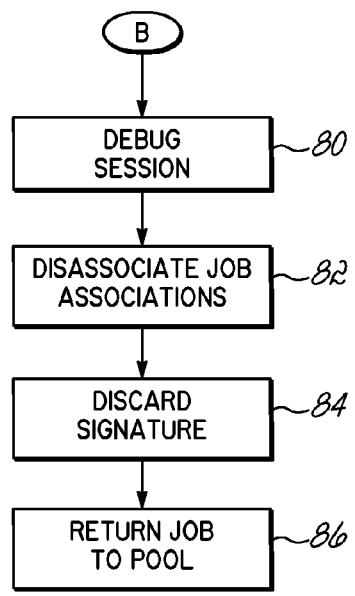

To perform a task, the illustrated embodiment utilizes a job selection algorithm 28 to start a job or select a pre-started job from the pre-started job pool 26. FIGS. 2-4 illustrate a flowchart for one job selection algorithm consistent with the invention. Turning first to FIG. 2, the program code initially requests a task be executed at step 40. The request may be initiated by a user input from the user interface 20, another computer communicably coupled to computer 10 through a network 18, an operating system 24, another task, another job, or otherwise from computer 10. In step 42 the program code generates a signature of the requested task ("task signature") and stores it in memory 14. The task signature may include a corresponding value of an input to the task, a user of the computer 10, a TCP/IP address, a SQL statement, a message to the computer 10, a socket address, a request from the network 18, another task, or another job.

At step 44 the program code compares the task signature with signatures associated with pre-started jobs. A signature may be associated with a job after there has been a fault condition while previously processing a task, creating an associated pre-started job. At step 46 the program code selects an associated pre-started job that has a signature that matches the task signature. The associated pre-started job can be the same job in which the fault condition occurred during a previous attempt to process a task. In an alternate embodiment, the associated pre-started job can be a job started after the fault condition occurred and associated with a signature of the task that experienced the fault condition. In a further alternate embodiment, the associated pre-started job can be a job that matches a particular user to ensure that only that particular user accesses the associated pre-started job.

In the absence of a pre-started job associated with a signature that matches the task signature at step 44, the program code determines whether a pre-started job is available in the pre-started job pool 26 at step 50. When there are no available pre-started jobs for the task in the pool 26, a job is started at step 52. When there is at least one available pre-started job in the pool 26, any pre-started job is selected at step 54. A pre-started job may be selected at step 54 using round-robin selection (including weighted or deficit round robin selection), random selection, resource-based selection, or a rotating list of pre-started jobs, among other algorithms. At step 56 the task is initiated in the newly started job or pre-started job.

In embodiments of the invention, the comparison of signatures of a task and pre-started jobs (step 44) and selection of an associated pre-started job (step 46) act as an "override" of a conventional job selection algorithm. In a conventional job selection algorithm a pre-started job may be selected using round-robin selection (including weighted or deficit round robin selection), random selection, resource-based selection, or a rotating list of pre-started jobs despite previous fault conditions, among other algorithms. The intelligent job functionality described herein operates to override the selection of a pre-started job according to a conventional job selection algorithm if there is an associated pre-started job that matches the task signature. In this way, the intelligent job functionality of embodiments of the invention may be used with a suitable conventional job selection algorithm more or less as an exception to the conventional job selection algorithm. It will be appreciated, however, that overriding a job selection algorithm does not preclude the selection of a job based on task signature being performed as simply a step in an overall job selection algorithm.

Intelligent Job Functionality

FIG. 3 is a flowchart of the intelligent job functionality consistent with an embodiment of the invention when a task is processed in the newly started job or pre-started job, continuing from step 56 of FIG. 2. The created job or pre-started job is referred to as the "current job" for the sake of brevity. The program code determines if a fault condition (i.e., an error) has occurred during or after processing of the task in the current job at step 60. In such a way, the program code may be said to "diagnose" a fault condition. The program code may diagnose the error by auditing, tracing, or monitoring the current job during execution of the task for a fault condition. Typical fault conditions that the program code may be configured to diagnose include poor performance of a current job, an error in the current job operation, flawed data input to the current job, aberrant output from the current job, or a program exception encountered by the current job.

When the program code determines there has been no fault condition in the current job at step 60, the signature is discarded at step 62 and the current job is released. The current job is retained in memory 14 as a pre-started job and maintained in the pre-started job pool at step 64. When the program code determines a fault condition has occurred at step 60 the program code may be configured to create a new task signature and store it in memory 14, replacing the previously stored task signature generated in step 42. At step 66, the program code determines whether the current job should be immediately debugged. The option to debug the current job immediately after a fault has been determined may be configured by the user, operator, or administrator before processing of the task or during configuration of the program code or computer 10.

When it is determined that the option to immediately debug the job is not configured at step 66, the program code determines a debugging option to apply to the task in response to a subsequent attempt to perform the task at step 67. Debugging options can include the following: debugging the task in a new job loaded with debugging data in response to another attempt to perform the task; debugging the task in a new job that runs in an alternate environment in response to another attempt to perform the task; enabling a breakpoint and debugging routine in the same job that has experienced the fault condition in response to another attempt to perform the task; enabling a breakpoint and debugging routine in a new job in response to another attempt to perform the task; writing messages about the task to a log file in memory 14 in response to another attempt to perform the task; or otherwise outputting messages to the user through the display 22 in response to another attempt to perform the task. Due to the large number of options listed and otherwise possible, a debugging option is typically configured by the user, operator, or administrator before processing of the task, or during configuration of the program code or computer 10.

At step 68, the debugging option that was determined in step 67 is enabled. This can include starting a new job and configuring it with the debugging option, or configuring the current job with the debugging option. If a new job is started the job that experienced the fault condition is terminated at step 68. The new job or current job is associated with the task signature stored in memory 14 at step 70. At step 72, the job associated with the signature is released from the task, retained in memory 14 as an associated pre-started job, and maintained in the pre-started job pool 26.

When it is determined that the option to immediately debug the job is configured at step 66, the program code enters a debug session for the current job at step 74. Initial steps of the debug session at step 74 reverse operations of the current job to a point before the fault condition. The debug session at step 74 may reverse operations to a point in an instruction stream prior to where the fault condition or error occurred, e.g. the point before the fault condition occurred and before any data or parameters load. This process of reverse operation is referred to as "backing up the stack." When the debug session at step 74 has sufficiently backed up the stack, the debug session halts operation and prompts for user input. In one embodiment a user may take control of the debug session then diagnose and correct the fault. In this way, the user observes data or parameters loaded into the current job and may step into the current job to determine the cause of the fault condition. When the debug session at step 74 completes, the user or program code may terminate the current job. Alternatively, the user or program code may terminate the debug session at step 74 without terminating the current job. In one embodiment, if the user does not respond to the debug session prompt after a period of time, the program code terminates the debug session at step 74 along with the current job. After the debug session terminates at step 74 the signature is discarded at step 62. At step 64, if the current job was not terminated, the current job is released from the task, retained in memory 14 as a pre-started job, and maintained in the pre-started job pool 26.

FIG. 4 illustrates a flowchart of the intelligent job functionality of an embodiment of the invention when a task is processed in an associated pre-started job, continuing from block 46 of FIG. 2. At step 80, the program code enters a debug session. The debug session at step 80 will correspond to the debugging option enabled for the associated pre-started job at step 68 in FIG. 3.

Again referring to FIG. 4, the user or program code can terminate the associated pre-started job after the debug session at step 80 has completed. Alternatively, the user or program code can terminate the debug session at step 80 without terminating the associated pre-started job. In one embodiment, if the user does not respond to the debug session prompt after a period of time, the program code terminates the debug session at step 80 along with the associated pre-started job. At step 82, if the associated pre-started job has not been terminated, the associated pre-started job is disassociated with the task signature. The program code discards the signature and releases the pre-started job at step 84. At step 86, if the current job was not terminated, the current job is released from the task, retained in memory 14 as an associated pre-started job, and maintained in the pre-started job pool 26.

Intelligent job functionality consistent with an embodiment of the invention may be particularly useful on a server for a web site that has to service thousands of otherwise random connections per minute. One such server may be manufactured by International Business Machines and may be an iSeries model running WebSphere Application Server.

In an iSeries environment, an embodiment of the intelligent job functionality would have a choice of many debugging options that may be chosen at step 67 for operation on the next run of a pre-started job after a fault condition has occurred. One option can be to adjust the change query attributes (CHGQRYA) options to specify a query options file (QAQQINI) that will change the query optimization plan, begin output messages, or other options. A user can further specify which CHGQRYA option, entry point table (EPT), debuggable program, or service program options to apply in a given situation. A user can also specify a program to apply to the task that contains debug data in response to another attempt to process the task or a debug session to apply to the task in response to another attempt to process the task. A user can also choose an option to break at the beginning of an associated pre-started job and notify the user in response to another attempt to process the task. Alternatively, the intelligent job functionality consistent with one embodiment of the invention will apply the options on a current job such as at step 74.

Further details and embodiments of the present invention will be described by way of the following example.

Example 1

By way of example, computer 10 may be an application or web-server fielding requests from users on the network 18. Referencing FIG. 2, a first user, second user, and third user request a task to be executed at step 40. Each user has a signature created of their network address at step 42. At step 44, the task signatures are compared to the signatures associated with pre-started jobs. If this is the first request by first user, second user, and third user there may be no signature associated with pre-started jobs that match the task signature and the process proceeds to step 50. At step 50, it is determined if there are pre-started jobs in the pool and first user, second user, and third user are either assigned pre-started jobs in a manner similar to a conventional job-selection algorithm at step 54 or a job is created at step 52. The task for each user is initiated in a job at step 56.

Continuing with reference to FIG. 3, first user and second user experience a fault in their current job at step 60. Third user does not experience a fault at step 60 so the signature is discarded at step 62 and the job is returned to the pre-started job pool at step 64. Turning to first user, first user experiences a fault at step 60 and the current job has not been configured for immediate debugging as determined at step 66. The debugging option for current job of first user is determined as described above at step 67 and enabled as described above at step 68. The job enabled at step 68 is associated with the task signature at step 70 and the associated job is returned to the pre-started job pool at step 72. Turning to second user, second user experiences a fault at step 60 and the current job has been configured for immediate debugging as determined at step 66. The current job of second user is debugged at step 74. In one embodiment the connection to second user will be terminated and a user, operator, or administrator at computer 10 will be given the option to debug the fault condition at step 74 as described above. In another embodiment, second user will be given the option to debug the fault condition at step 74 as described above. Once the debug session has completed, the task signature from second user is discarded at step 62 and the current job of second user is returned to the pre-started job pool at step 64.

With reference again to FIG. 2, first user, second user, and third user again request a task to be executed at step 40. Each user again has a signature created of their network address at step 42. At step 44, the task signatures are compared to the signatures associated with pre-started jobs. In this example, there is a signature associated with a pre-started job that matches the task signature for first user, and the associated pre-started job is selected for first user at step 46. Because second user and third user did not have a task signature that matches a signature associated with pre-started jobs, they will proceed as outlined above in this example to step 50.

Focusing on first user and with reference to FIG. 4, a debug session is begun at step 80 after initiation of the task in the associated pre-started job at step 48 of FIG. 2. In one embodiment the connection to first user will be terminated and a user, operator, or administrator at computer 10 will be given the option to debug the fault condition at step 80 as described above. In another embodiment, first user will be given the option to debug the fault condition at step 80. Once the debug session has completed, the associated pre-started job of first user is disassociated with the signature at step 82 if it had not been terminated at step 80. The task signature is discarded at step 84 and the job is returned to the pre-started job pool at step 86 if it had not been terminated at step 80.

While the present invention has been illustrated by a description of the various embodiments and the example, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of diagnosing an error in a computer attempting to perform a task in a first job, the method comprising:
    selecting the first job from among a plurality of pre-started jobs to perform the task using a job selection algorithm;
    detecting the error when performing the task in the first job; and
    in response to another attempt to perform the task, overriding the job selection algorithm by selecting a predetermined job in which to perform the task and diagnose the error.

2. The method of claim 1, wherein the error includes poor performance of the task.

3. The method of claim 1, wherein the error is caused by data input to the task.

4. The method of claim 1, wherein the error is caused by an operation of the task.

5. The method of claim 1, wherein detecting the error when performing the task in the first job further comprises:
    in response to detection of the error, generating a signature that corresponds to the task;
    associating the first job with the signature for subsequent retrieval of the first job upon another attempt to perform the task; and
    returning the first job to the plurality of pre-started jobs.

6. The method of claim 5, wherein the predetermined job selected in response to another attempt to perform the task is the first job associated with the signature.

7. The method of claim 5, wherein the signature includes an interne protocol address.

8. The method of claim 5, wherein the signature includes an operator identification.

9. The method of claim 5, wherein the signature includes a network socket address.

10. The method of claim 5, wherein the signature includes a query.

11. The method of claim 1, further comprising:
    halting the predetermined job; and
    alerting an operator of the computer that an error has occurred.

12. The method of claim 11, further comprising:
    diagnosing and correcting the error in response to operator input.

13. The method of claim 11, further comprising:
    in response to halting the predetermined job, reversing operations of the predetermined job to a point in an instruction stream prior to where the error occurred.

14. The method of claim 1, wherein selecting a predetermined job in which to perform the task and diagnose the error further comprises:
    creating a new job that is not among the plurality of pre-started jobs to perform the task; and
    selecting the new job in which to perform the task and diagnose the error.

15. The method of claim 1, wherein selecting a predetermined job in which to perform the task and diagnose the error further comprises:
    creating a new job that is not among the plurality of pre-started jobs to perform the task, wherein the new job operates in a different environment than the first job.

16. The method of claim 1, further comprising:
    generating a signature that corresponds to the task.

17. A method of diagnosing an error in a computer attempting to perform a task in a first job, the method comprising:
    selecting the first job from among a plurality of pre-started jobs to perform the task using a job selection algorithm;
    generating a signature that corresponds to the task;
    detecting the error when performing the task in the first job;
    in response to detection of the error, associating a second job with the signature for subsequent retrieval of the second job upon another attempt to perform the task;
    returning the first job and second job to the plurality of pre-started jobs; and
    in response to another attempt to perform the task, overriding the job selection algorithm by selecting the second job in which to perform the task and diagnose the error.

18. An apparatus comprising:
    at least one processor; and
    program code configured to be executed by the at least one processor to select a first job from among a plurality of pre-started jobs to perform a task using a job selection algorithm, detect an error when performing the task in the first job, and override the job selection algorithm by selecting a predetermined job in which to perform the task and diagnose the error in response to another attempt to perform the task.

19. The apparatus of claim 18, wherein the program code is further configured to generate a signature that corresponds to the task to in response to detection of an error, associate the first job with the signature for retrieval of the first job upon another attempt to perform the task, and return the first job to the plurality of pre-started jobs.

20. The apparatus of claim 18, wherein the program code is further configured to halt the predetermined job in response to another attempt to perform the task and alert an operator of the apparatus that an error has occurred.

21. The apparatus of claim 19, wherein the program code is further configured to diagnose and correct the error in response to operator input.

22. The apparatus of claim 18, wherein the program code is further configured to create a new job that is not among the plurality of pre-started jobs to perform the task.

23. The apparatus of claim 22, wherein the program code is further configured to override the job selection algorithm to prevent creation of a new job in response to input of an operator.

24. A program product, comprising:
    program code configured to select a first job from among a plurality of pre-started jobs to perform a task using a job selection algorithm, detect an error when performing the task in the first job, and, in response to another attempt to perform the task, override the job selection algorithm by selecting a predetermined job in which to perform the task and diagnose the error; and
    a non-transitory computer readable storage medium bearing the program code.

* * * * *